United States Patent Office

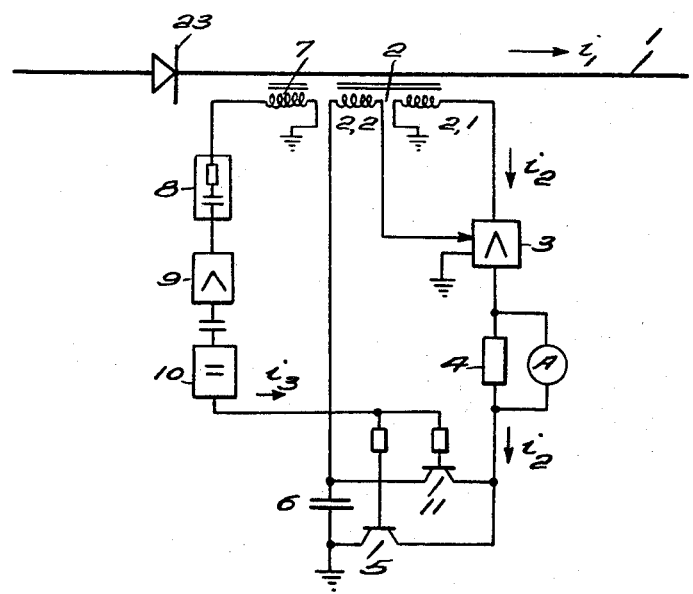
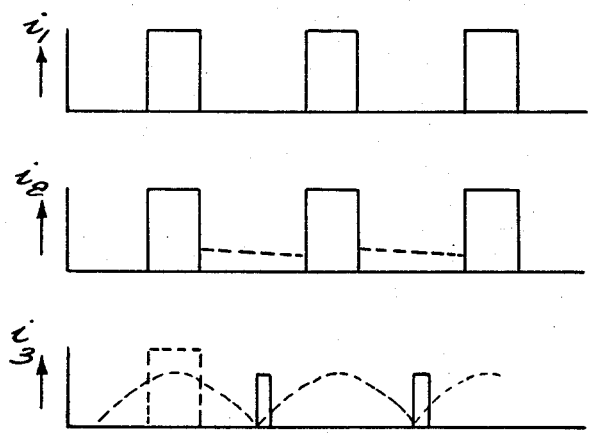

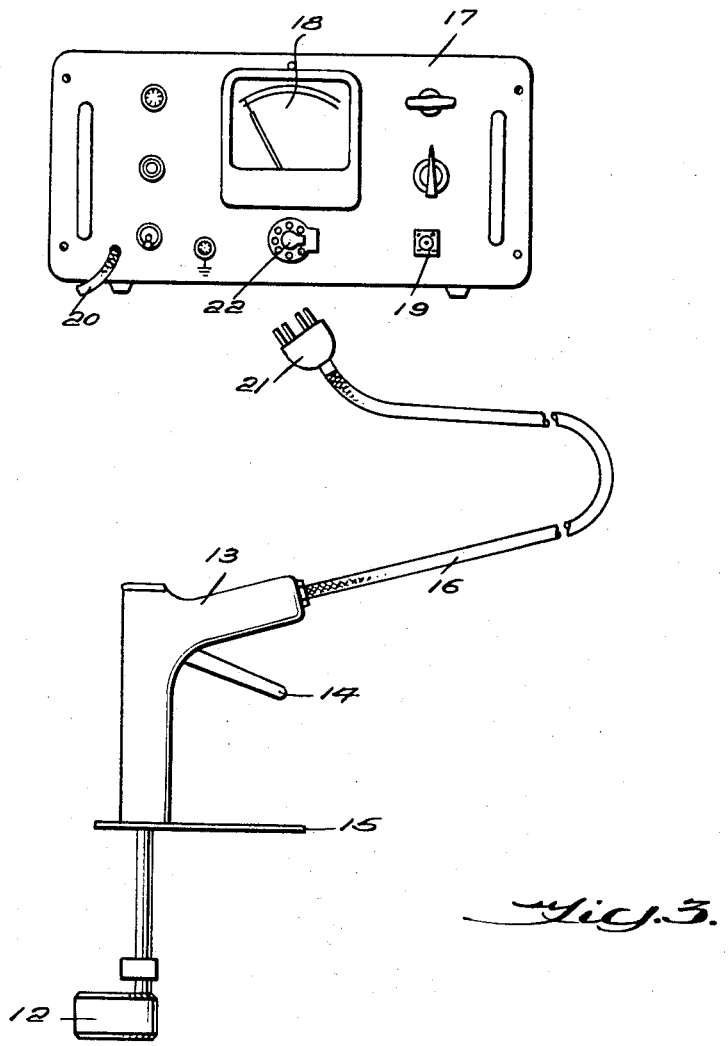

3,411,087
Patented Nov. 12, 1968

3,411,087
APPARATUS FOR MEASURING DIRECT
CURRENT IMPULSES
Xaver Vogel, Wettingen, and Peter Knapp, Nussbaumen,
Aargau, Switzerland, assignors to Aktiengesellschaft
Brown Boveri & Cie, Baden, Switzerland, a joint-stock
company
Filed June 11, 1965, Ser. No. 463,206
7 Claims. (Cl. 324—127)

This invention relates to apparatus for measuring direct current impulses, comprising current transformers with two secondary windings, one of which supplies a measuring current circuit and the other a compensating current circuit.

For the secondary measurement of direct current, use is made of direct current transformers which are made similarly to transductors. The primary direct current is used as excitor current for the transductor. An alternating voltage is connected to the transductor which produces an alternating current which is a function of the excitation state of the transductor. The effective value of the alternating current can be made proportional to the applied direct current by suitable layout of the direct current transformer.

With this arrangement it is possible to reproduce the current level of a continuous direct current but not the shape of the current. For detecting oscillating direct currents, i.e. direct currents with superimposed alternating current ripple a plurality of transductor cores has been provided, so that by parallel circuiting, a compensation of the transmission error and accordingly greater accuracy for the measurement of the direct current component can be obtained. With this circuit the alternating current component compensates itself so that it cannot be detected by a direct current transformer of this type. By means of a plurality of core systems, surrounded simultaneously by the primary and secondary winding, the possibility exists, with suitable lay-out of the cores, of relaying the direct and alternating current components separately. One core system is then wired as a transductor whereas the other forms a normal alternating current transformer.

With such devices, though it is possible to relay a direct current with superimposed alternating current component, an additional alternating current supply is necessary for the transductor and also a plurality of cores which take up a considerable amount of space.

In semi-conductor equipment, where interrupted direct current impulses occur and where, for equipment, for higher current values, a plurality of circuits are connected in parallel, the known system would influence the distribution of the currents in the parallel circuits, as transductors have internal resistance. Furthermore, it is desirable to be able to control the separate currents during operation, and for this, use is made, as is known, of measuring clamps placed over the conductor, and which then measure the current. Such clamps have cores and secondary windings which are placed over the conductor, but with the known forms such a device would have too great bulk to be provided in semi-conductor equipment, or its use would mean that the semi-conductor equipment would have to be unnecessarily large. Accordingly, there is a problem here of finding a measuring device which has as low as possible self impedance and takes up only so much room that an additional attachment is possible during operation by means of measuring clamps; with the previous forms it was not possible to achieve this.

This invention resides in apparatus for measuring direct current impulses, including a current transformer having a first secondary winding connected to a current measurement circuit and a second secondary winding connected to a compensating current circuit, the second secondary winding being connected with a control circuit of a direct current amplifier in such a way that this amplifier produces an output voltage only when current flows in the primary circuit and the first secondary winding being connected via the output circuit of this amplifier with a measurement device, the amplifier being such that its output voltage compensates the voltage drops in the current measurement circuit.

The invention will now be further described with reference to the accompanying drawings, which show an embodiment of the invention by way of example only, and in which FIGURES 1 and 2 are a circuit diagram and current curves illustrating the functioning of the system of the invention, and FIGURE 3 shows constructional details.

FIGURE 1 shows a conductor 1 leading from a rectifier 23 and in which a current $i_1$ flows; to the said line 1 a current transformer 2 is connected, which has the windings 2.1 and 2.2. A normally blocked amplifier 3 and a shunt 4 are connected to the winding 2.1. A measuring device A is connected to the shunt 4, and can consist e.g. of an ammeter or an oscillograph; shunt 4 is connected via a transistor 5, which is normally open, back to the transformer (the return circuit is represented by the earth line). The winding 2.2 is connected to the control circuit of the amplifier 3 and is connected on the other side via a capacitor 6 with earth.

The apparatus functions as follows: the current $i_1$ is shown diagrammatically in FIGURE 2 in the upper diagram and consists of D.C. impulses relayed by the transformer 2 to the secondary coil 2.1. In the latter a current $i_2$ flows, which should have substantially the same shape as the current $i_1$. In order to compensate the voltage drops on the primary and secondary sides of the transformer and in the supply lines, this current $i_2$ is applied to the amplifier 3. The said amplifier 3 compensates these voltage drops, and accordingly acts as a negative resistance so that as a whole no additional impedance occurs through the winding 2.1 at the line 1. In the winding 2.2 there also occurs a voltage during the period in which the impulse takes place, and accordingly tht amplifier 3 is unblocked. At the moment when this voltage disappears the amplifier 3 is blocked and no current can flow through the measuring device. The level of the current flowing through the amplifier 3 is controlled by the voltage at the secondary winding 2.2.

In order to ensure that the voltage drops are actually compensated, the gain of the amplifier must have a certain level. It is required also that the winding 2.2 shall be as free from impedance as possible, and this can be obtained by having the input of the amplifier 3 at a very high impedance. To ensure complete compensation of the voltage drops with high currents despite this high input impedance, the gain must be comparatively high and it is proposed in this connection that the gain should be 1000.

Care must now be taken that the amplifier 3, during the intervals without current, i.e. during the interruptions in the direct current $i_1$, is actually controlled on zero. To ensure this a further special device is provided which, if a voltage still occurs at the amplifier 3, can control the amplifier in such a way that the voltage 0 can again occur. This device is a second transformer 7 which has a separate iron core, which transformer relays the direct current impulses, transformed by a filter 8 into sine curve as can be seen in the lowest part of FIGURE 2; the rectangular pulses being transformed into the current $i_3$, i.e. the fundamental wave is passed by the filter 8. This fundamental wave is then amplified by an amplifier 9 and fed to an impulse generator 10, so that impulses occur when the fundamental wave passes through 0, as it to be seen in FIG.

2. These impulses control the two transistors 5 and 11, in such a way that the transistor 5 is blocked, resulting in the earth connection being broken, and the transistor 11 conducts. The two transistors are accordingly of opposite type, i.e. PNP and NPN. If a voltage exists at the resistor 4 as shown in broken lines in the middle diagram of FIG. 2, then this voltage is passed to the capacitor 6, with the result that the circuit containing the secondary winding 2.2 receives a voltage which controls the amplifier in such a way that it now has the output 0. This device works at each interrupting of the D.C. so that at all times there is a check that the amplifier 3 is properly controlled. The two transistors 5 and 11 in this connection form an electronic switch.

As FIGURE 3 shows, the transformer can be disposed in a measurement clamp 12 and the attached instruments and other elements arranged in a special measurement housing. The connection between the measurement clamp 12 and the housing 17 can be established by a cable 16, and the measurement transformers 2 and 7 are arranged within clamp 12. Associated with clamp 12 is a hand grip 13 to facilitate placing clamp 12 on the current carrying conductor, not illustrated. A lever 14 on hand grip 13 is provided for actuation of clamp 12 to its open and closed positions. Also, hand grip 13 supports a protective plate 15 which can be made of Plexiglas or any other suitable insulating material to prevent one's hand from touching any voltage carrying parts. Cable 16 can be connected permanently to housing 17 or it can be coupled thereto by the usual plug and socket connection 21, 22. A plug-in type junction 19 is provided on housing 17 for connecting in an oscillograph, and a lead 20 from the housing is provided for connection to a source of auxiliary voltage for controlling the transistor units 5 and 11 located within the housing.

The advantage of the arrangement shown in FIG. 3 is that it facilitates application of the current measurement device to semi-conductor plants occupying a relatively small space to measure the current in a single parallel branch without affecting these and yet obtain a fully precise measurement of the current amplitude and form. Also, the FIGURE 3 embodiment furnishes the possibility that one can obtain an automatic regulation of the apparatus.

We claim:

1. Apparatus for measuring direct current impulses comprising a current transformer including first and second secondary windings adapted to be brought into conductive relationship with the line conductor carrying the direct current impulses desired to be measured, a controllable amplifier and a current measuring device connected in series in a measuring circuit connected to said first secondary winding, said amplifier serving to compensate for voltage drops in said measuring circuit and being blocked in the absence of current flow in said line conductor, and control circuit means connecting said second secondary winding with the control means provided on said amplifier for unblocking the same to establish current flow to said measuring device but only when current flows in said line conductor, 2. Apparatus as defined in claim 1 for measuring direct current impulses wherein said amplifier has a high input impedance and a gain factor of at least 1,000, 3. Apparatus as defined in claim 1 for measuring direct current impulses wherein said first and second secondary windings are disposed in a measurement clamp adapted to be applied around said line conductor, and the remaining parts of said apparatus are contained within a separate housing and electrically connected with said secondary windings by means of a cable.

4. Apparatus for measuring direct current impulses comprising a current transformer including first and second secondary windings adapted to be brought into inductive relationship with the line conductor carrying the direct current impulses desired to be measured, a controllable amplifier and a current measuring device connected in series in a measuring circuit connected to said first secondary winding, said amplifier serving to compensate for voltage drops in said measuring circuit and being blocked in the absence of current flow in said line conductor, control circuit means connecting said second secondary winding and a capacitor in series with the control means provided on said amplifier for unblocking the same to establish a current flow to said measuring device but only when current flows in said line conductor, a second current transformer having a secondary winding adapted to be brought into inductive relationship with said line conductor, said secondary winding of said second current transformer being connected to a circuit including and controlling an impulse generator which produces at its output an impulse whenever the impulse current flow in said line conductor reaches magnitude zero, and switch means connected in the output of said impulse generator, said switch means being closed by each impulse to connect said condenser into said measuring circuit and apply thereto whatever voltage may exist at the output of said amplifier, said condenser voltage serving to reset said amplifier to a zero output.

5. Apparatus as defined in claim 4 for measuring direct current impulses and which includes a filter connected into the circuit between said secondary winding of said second current transformer and the input to said impulse generator to transform the current flow into a wave form.

6. Apparatus as defined in claim 4 for measuring direct current impulses wherein said switch means is of the electronic type.

7. Apparatus as defined in claim 4 for measuring direct current impulses and which includes a second switch means controlled by the impulse output from said impulse generator, said second switch means being included in said measuring circuit and being arranged in reverse relation to said first switch means such that when said first switch means is in a current conducting condition said second switch means is in its current blocking condition, and vice versa.

References Cited

UNITED STATES PATENTS 2,428,613 10/1947 Boyajian _____ 324—127 X
3,166,678 1/1965 Fleshman _____ 328—150 X

FOREIGN PATENTS 912,721 12/1962 Great Britain.

RUDOLPH V. ROLINEC, *Primary Examiner.*

P. A. URIBE, *Assistant Examiner.*